(12) United States Patent
Krause et al.

(10) Patent No.: US 8,346,749 B2
(45) Date of Patent: Jan. 1, 2013

(54) BALANCING THE COSTS OF SHARING PRIVATE DATA WITH THE UTILITY OF ENHANCED PERSONALIZATION OF ONLINE SERVICES

(75) Inventors: Ranier Andreas Krause, Pittsburgh, PA (US); Eric Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 341 days.

(21) Appl. No.: 12/147,557

(22) Filed: Jun. 27, 2008

(65) Prior Publication Data

US 2009/0327228 A1 Dec. 31, 2009

(51) Int. Cl.
G06F 17/30 (2006.01)
(52) U.S. Cl. ........ 707/706; 707/707; 707/719; 707/732; 707/767
(58) Field of Classification Search .......... 707/705–713, 707/732, 783–785, 719, 767; 702/181–182; 705/14.73, 10, 1–2, 26–27; 709/203, 215–220; 715/867, 759
See application file for complete search history.

(56) References Cited

U.S. PATENT DOCUMENTS

| | | | |
|---|---|---|---|
| 6,141,655 A * | 10/2000 | Johnson et al. ........................ 1/1 |
| 6,687,696 B2 * | 2/2004 | Hofmann et al. ...................... 1/1 |
| 6,970,067 B1 | 11/2005 | Sinke et al. |
| 7,162,451 B2 | 1/2007 | Berger et al. |
| 7,162,522 B2 * | 1/2007 | Adar et al. .................... 709/224 |
| 7,818,315 B2 * | 10/2010 | Cucerzan et al. ............ 707/723 |
| 7,987,185 B1 * | 7/2011 | Mysen et al. ................. 707/733 |
| 2001/0013009 A1 * | 8/2001 | Greening et al. .............. 705/10 |
| 2002/0042793 A1 * | 4/2002 | Choi ................................. 707/6 |
| 2002/0103793 A1 * | 8/2002 | Koller et al. ...................... 707/3 |
| 2003/0115196 A1 * | 6/2003 | Boreham et al. ................. 707/4 |
| 2003/0195793 A1 * | 10/2003 | Jain et al. ........................ 705/10 |
| 2004/0034652 A1 * | 2/2004 | Hofmann et al. ............ 707/102 |
| 2004/0034799 A1 * | 2/2004 | Mikami ....................... 713/201 |
| 2005/0071328 A1 * | 3/2005 | Lawrence ......................... 707/3 |
| 2005/0222989 A1 * | 10/2005 | Haveliwala et al. .............. 707/3 |
| 2005/0232253 A1 * | 10/2005 | Ying et al. .................... 370/356 |
| 2005/0246358 A1 * | 11/2005 | Gross ........................... 707/100 |
| 2006/0010105 A1 * | 1/2006 | Sarukkai et al. .................. 707/3 |
| 2006/0047643 A1 * | 3/2006 | Chaman ............................ 707/3 |
| 2006/0059147 A1 | 3/2006 | Weiss et al. |
| 2006/0155764 A1 | 7/2006 | Tao |
| 2006/0248059 A1 * | 11/2006 | Chi et al. .......................... 707/3 |

(Continued)

FOREIGN PATENT DOCUMENTS

WO WO 01/03028 * 1/2001

(Continued)

OTHER PUBLICATIONS

Anita L. Ondrusek, "The attributes of research on end-user online searching behavior: A retrospective review and analysis",Library & Information Science Research 26 (2004) 221-265.*

(Continued)

Primary Examiner — Srirama Channavajjala

(57) ABSTRACT

Described herein is a method that includes determining a utility to a user of sharing a set of attributes for use in connection with personalized searching or other online services. The method further includes determining a cost to the user of sharing the set of attributes. The method also includes outputting an indication of a net benefit to the user of sharing the set of attributes based at least in part upon the determined utility and the determined cost.

20 Claims, 13 Drawing Sheets

U.S. PATENT DOCUMENTS

| | | | |
|---|---|---|---|
| 2006/0294086 A1* | 12/2006 | Rose et al. | 707/3 |
| 2007/0005425 A1* | 1/2007 | Bennett et al. | 705/14 |
| 2007/0112761 A1* | 5/2007 | Xu et al. | 707/5 |
| 2007/0136295 A1 | 6/2007 | Gorodyansky et al. | |
| 2007/0143260 A1 | 6/2007 | Markov et al. | |
| 2007/0203887 A1* | 8/2007 | Dynin | 707/3 |
| 2007/0250500 A1 | 10/2007 | Ismalon | |
| 2007/0288432 A1* | 12/2007 | Weltman et al. | 707/3 |
| 2008/0109491 A1* | 5/2008 | Gupta | 707/104.1 |
| 2008/0140711 A1* | 6/2008 | Hyder et al. | 707/104.1 |
| 2009/0070318 A1* | 3/2009 | Song et al. | 707/5 |
| 2009/0157659 A1* | 6/2009 | Satoh et al. | 707/5 |
| 2010/0145922 A1* | 6/2010 | Yoon et al. | 707/706 |
| 2010/0268710 A1* | 10/2010 | Strehl et al. | 707/732 |

FOREIGN PATENT DOCUMENTS

| | | | |
|---|---|---|---|
| WO | WO 2004102925 | * | 11/2004 |
| WO | WO 2005098611 | * | 10/2005 |
| WO | 2006017364 A1 | | 2/2006 |
| WO | WO 2007/064639 | * | 6/2007 |

OTHER PUBLICATIONS

Christos Makris et al., "Category ranking for personalized search", Data & Knowledge Engineering 60 (2007) 109-125.*

Rey-Long Liu wt al., "Incremental mining of information interest for personalized web scanning", Information Systems 30 (2005) 630-648.*

Chellappa, "A model of advertiser—portal contracts: Personalization strategies under privacy concerns", 2006.13 Pages.

Preibusch, "Implementing Privacy Negotiation Techniques in E-Commerce", Proceedings of the Seventh IEEE International Conference on E-Commerce Technology, 2005, 4 Pages.

"Privacy Trade-Offs in Web-Based Services" http://edoc.hu-berlin.de/dissertationen/boyens-claus-2004-12-15/HTML/chapter5.html.

Olson, et al, "A Study of Preferences for Sharing and Privacy", 2005, 5 Pages.

Sugiyama, et al "Adaptive Web Search Based on User Profile Constructed without Any Effort from Users", 2004, 10 Pages.

Stephen Boyd, "Convex Optimization", 2004, 730 Pages.

Cynthia Dwork, "Differential Privacy", 12 Pages, 2006.

Cover, et al, "Wiley Series in Telecommunications", Elements of Information Theory, 2006, 36 Pages.

Dou, et al, "A Large-scale Evaluation and Analysis of Personalized Search Strategies" 2007, 10 Pages.

Hore, et al, "Flexible Anonymization for Privacy Preserving Data Publishing: A Systematic Search Based Approach" 6 Pages, 2007.

Latanya Sweeney, "k-Anonymity: A Model for Protecting Privacy", Fuzziness and Knowledge-based Systems, 10 (5), 2002; pp. 557-570.

Feige, et al, "Maximizing non-monotone submodular functions", 48th Annual IEEE Symposium on Foundations of Computer Science (FOCS'07) pp. 461-471, 2007.

Downey, et al, "Models of Searching and Browsing: Languages, Studies, and Applications", 2007, 8 Pages.

Lefevre, et al, "Mondrian Multidimensional K-Anonymity", 2006, 11 Pages.

Krause, et al "Near-optimal Nonmyopic Value of Information in Graphical Models", 2005, 8 Pages.

Kleinberg, et al, "On the Value of Private Information", Proceedings of the 8th conference on Theoretical aspects of rationality and knowledge, 2001, 9 Pages.

Teevan et al, "Personalizing Search via Automated Analysis of Interests and Activities", 2005, 8 Pages.

Xu et al, "Privacy-Enhancing Personalized Web Search" 2007, 10 Pages.

Adam, et al, "Security-control methods for statistical databases: a comparative study", ACM Computing surveys, vol. 21, No. 4, Dec. 1989, 42 Pages.

Eytan Adar, "User 4XXXXX9: Anonymizing Query Logs", 2007, 8 Pages.

Huberman, et al, "Valuating Privacy", 2005, 9 Pages.

Machanavjjhala, et al, "L-Diversity: Privacy Beyond K-Anonymity", ICDE, 2006, 53 Pages.

* cited by examiner

BALANCING THE COSTS OF SHARING PRIVATE DATA WITH THE UTILITY OF ENHANCED PERSONALIZATION OF ONLINE SERVICES

BACKGROUND

Notions with respect to what is and is not a violation of privacy of an individual have drastically changed over time. For instance, years ago taking a photograph of a specific person without the knowledge and consent of that person was thought to be a violation of the privacy of that person. In contrast, given the proliferation of digital cameras, most individuals do not deem a photograph that includes them as an invasion of their privacy. In another example, at one time people, in general, felt that the idea of a telephone ringing in their home was invasive of their privacy. Today, portable telephones often ring in pockets of individuals, and in general people do not give a second thought to privacy when a telephone rings.

Currently, large amounts of data can be collected with respect to individuals that perform searches by way of a search engine or service. For instance, information can be captured regarding a user's location, IP address, previous searches, time that searches are performed, day of week that searches are performed, and/or the like. Collection, analysis, and/or retention of this type of data may, for a particular user, bring about concerns relating to privacy. For instance, given a certain amount of information about a user, such user may become identifiable or their identity may be one of a relatively small set of users. Once a person is identified or can be identified, information such as what types of websites they visited, queries provided, time that searches were performed, and the like can be associated with the identified user, which typically will not be desirable to the user.

From a different perspective, however, information collected with respect to a user can improve operation of a search engine with respect to the user. This type of information, as well as other information about context, interests, and goals of a user can be used to enhance web search. For example, knowledge of a searcher's location can be useful in identify informational goals when the user inputs queries such as "pizza" or "sports".

SUMMARY

The following is a brief summary of subject matter that is described in greater detail herein. This summary is not intended to be limiting as to the scope of the claims.

Various technologies relating to optimizing or substantially optimizing trade-offs between costs (e.g., costs related to privacy) of sharing attributes that correspond to a user and utility/value of information (e.g., improvements to search results) of sharing attributes that correspond to the user are described herein. Pursuant to an example, a value of information/utility to a user can be determined for an attribute or a set of attributes. Such value of information/utility may indicate an expectation of improved search results to a user if the attribute or set of attributes are employed in connection with a search initiated by the user. The determined utility may be query-specific or may be determined in general for the user.

Additionally, a cost to the user of sharing the attribute or set of attributes can be determined, wherein the cost is indicative of notions about privacy held by a particular user or a population of users. For instance, sharing an attribute that corresponds to a precise location of a user may be deemed by the user as being highly intrusive of their privacy, while providing a coarse location (e.g., the region of a large country) or information such as their gender may not be deemed highly intrusive of their privacy. Pursuant to an example, the perceived cost to a user of sharing one or more attributes of data about themselves or their online activities may correspond to a probability that the user can be identified given the attribute or set of attributes.

Based at least in part upon a measure of utility and a measure of cost corresponding to the user sharing the attribute or set of attributes, a net benefit to the user for sharing such attributes can be ascertained. For instance, under assumptions of decomposability of the overall value of an online service to a user into the utility and cost of sharing information that is used to personalize the service, the net benefit to the user for sharing the attribute or set of attributes can be the difference between the determined utility and the determined cost. An attribute or set of attributes that optimizes or substantially optimizes this net benefit to the user in particular or to a population of users in general can be determined. The attribute or set of attributes that correspond to the optimal or substantially optimal net benefit can be found using any suitable mechanism, including greedy approaches or approximations.

Furthermore, user profiles can be created that reflect, for instance, the preferences about privacy held by the user. Mechanisms are described herein that can aid the user in connection with determining which attributes they would like to share. For instance, recommendations can be output to the user, wherein the recommendations may indicate which attributes can be added to or removed from a list of attributes that the user does not mind sharing to increase the net benefit of sharing attributes to the user.

Other aspects will be appreciated upon reading and understanding the attached figures and description.

DETAILED DESCRIPTION

Figure 1:
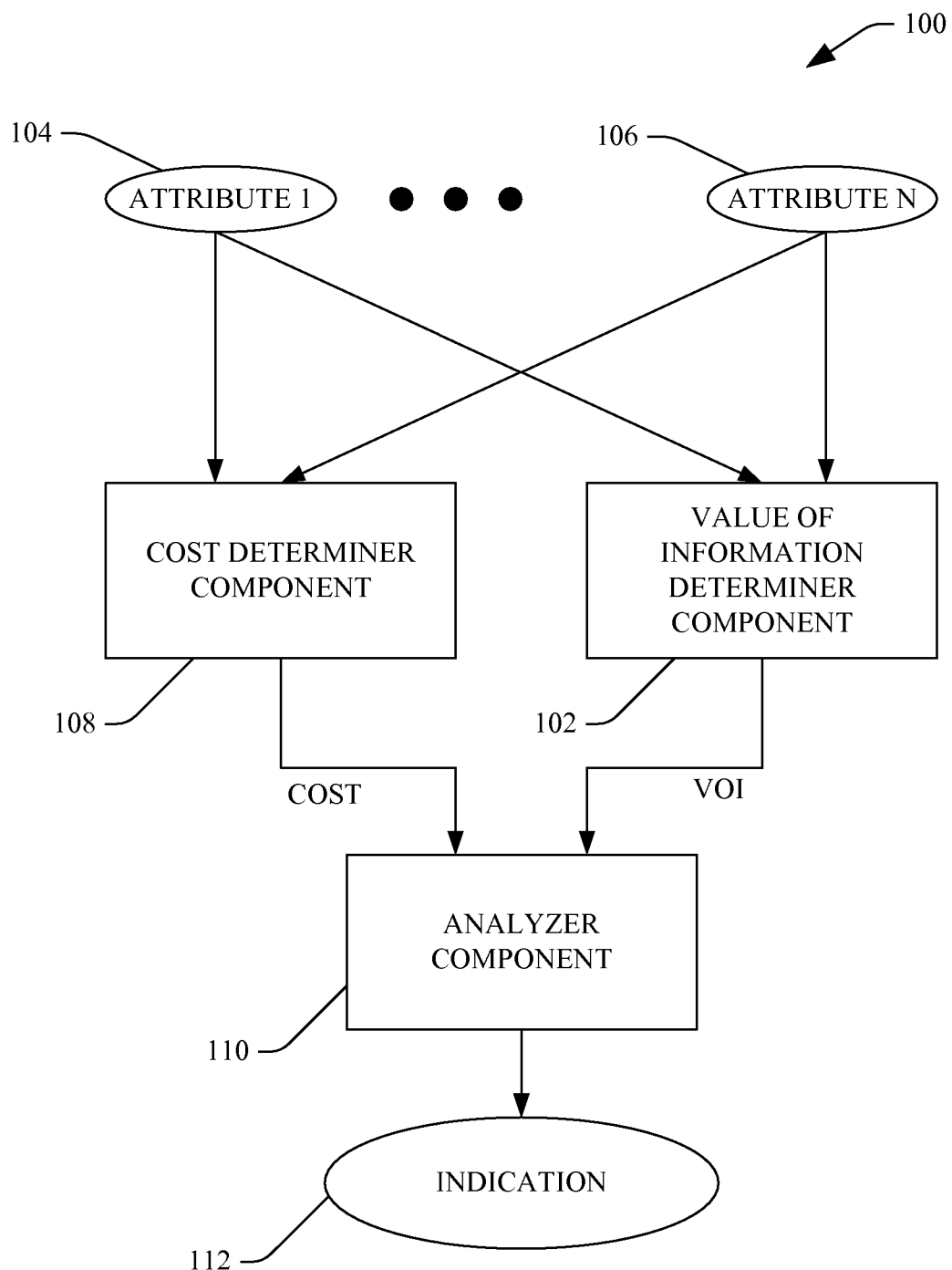
FIG. 1 is a functional block diagram of an example system that facilitates outputting an indication of a net benefit of sharing attributes in connection with personalized search.

Various technologies pertaining to balancing improvement of personalized search services (through collection of data pertaining to a user) with data privacy concerns will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates balancing costs to a user of sharing attributes corresponding to the user with a benefit of sharing the attributes with respect to personalized search is illustrated. Personalized search is taken to represent an example of a broad class of online services. Personalized search refers to a search whose results can be ranked according to at least one attribute that is personal to the user, such as a location of the user, a topic that is of interest to the user, previous searches performed by the user, etc. In the examples described herein, personalized search can refer to a search over a shared network, such as the Internet, an intranet, or the like.

The system 100 includes a value of information determiner component 102 that determines a value (utility) to the user of sharing one or more attributes 104-106 that correspond to the user, wherein such attributes can be used in connection with a personalized search. The attributes 104-106 can include, for instance, an IP address that corresponds to the user, age of the user, gender of the user, one or more topics that are found to be of interest to the user, time of day that the user has initiated a search, queries provided by the user, occupation of the user, day of week that the user has provided a query to a search engine, information that can be ascertained from performing a desktop search such as words frequently used in documents on a computer owned by the user, amongst other information.

As more and more of these attributes are acquired, search results can be further customized (and relevant) to the user. It can be ascertained, however, that a particular attribute or collection of attributes may provide more value/utility when performing a personalized search than other attributes. Furthermore, different attributes may have different values/utilities for different users. In an example, the value of information determiner component 102 can determine a value of information for an attribute or a set of attributes with respect to a population of users. In another example, the value of information determiner component 102 can determine a value of information for an attribute or a set of attributes with respect to a particular user or a relatively small subset of users. As used herein, the terms "value of information" and "utility" may be interchangeable.

Pursuant to a specific example, a value of information determined by the value of information determiner component 102 can be based at least in part upon data collected that indicates user satisfaction with search results when particular attributes corresponding to users are employed during a personalized search. For instance, users can submit certain queries and a search engine can perform a search while considering one or more attributes of the users. Given sufficient data about users in general, a value of information with respect to an attribute or collection of attributes can be ascertained for users in general. Similarly, if sufficient data pertaining to a particular user is collected, a value of information with respect to an attribute or collection of attributes can be ascertained for that particular user.

In another example, the value of information determiner component 102 can be or include a learned probabilistic model that can be used to output a value of information for an attribute or set of attributes. For instance, a joint distribution P over random variables, which include a target search intention X, some request-specific attributes (e.g., a query term) Q, an identity of the user Y, and several attributes $V=\{V_1, V_2, \ldots, V_m\}$ can be learned. For instance, the attributes may include user-specific variables such as demographic information, search history, word frequencies on a desktop, etc. as well as request-specific variables, such as a period of time that has passed since an identical query was submitted. Statistical techniques can be used to learn the model P from training data for frequent queries.

Upon receiving a new request Q, and given a subset $A \subset V$ of the attributes 104-106, the probabilistic model (which can be included in or used by the value of information determiner component 102) can be employed to predict a target intention of the user issuing the request by computing a conditional distribution P(X|Q, A). Such distribution can be employed to determine, for instance, which search results to return to a user. Knowledge about a particular user may help simplify the prediction task via reducing the uncertainty in P(X|Q, A). Uncertainty in the prediction can be quantified using the conditional Shannon (click) entropy associated with variance in target web sites following queries, $H(X|Q,A) = -\Sigma_{x,q,a} P(x,q,a) \log_2 P(x|q,a)$.

Thus, for any subset $A \subset V$, the utility U(A) can be defined as an expected entropy reduction achieved by observing A:

$$U(A) = H(X|Q) - H(X|Q, A)$$
$$= -\sum_{x,q,a} P(x, q, a)[\log_2 P(x|q) - \log_2 P(x|q, a)]$$

The value of information determiner component 102 can, for instance, use the above algorithm to output a value of information with respect to a subset of the attributes 104-106.

The system 100 further includes a cost determiner component 108 that determines a cost to the user of sharing one or more of the attributes 104-106. For instance, while information about a person (e.g., the attributes 104-106) can enhance accuracy of search engines, sensing and storing such information may conflict with personal preferences about privacy (both with respect to a relatively large population and with respect to a single user or relatively small set of users). Accordingly, sharing attributes that correspond to the user can be considered a cost to the user, wherein such cost can at least partially offset the benefits of improved search results.

Pursuant to an example, the cost determiner component 108 can determine a cost with respect to an individual user. For instance, the user may answer a question or series of questions that indicate how the user feels about sharing certain information about themselves and/or their activities, and the answers to such questions can be indicative of the cost to the user of sharing attributes for use when by a search engine when a search is performed. For instance, the user may indicate that she is willing to share a state in which they reside but is not willing to share a street address of her residence. In another example, the user may indicate that she does not want their activities with respect to one or more topics searched for or visited to be collected, stored, or analyzed. In addition, the cost determiner component 108 can determine a cost of sharing attributes with respect to a relatively large population. For instance, training data can be collected that pertains to costs of acquiring certain attributes perceived by numerous users.

Pursuant to a particular example, a cost function used by the cost determiner component 108 can be based at least in part upon the notion that sets of attributes $A \subset V$ that make identification of individuals difficult are desirably selected. For instance, observed attributes A can be considered noisy observations of an (unobserved) identity $Y=y$ of a user. A high cost $C(A)$ may desirably correspond to sets of the attributes (A) that allow accurate prediction of Y given A, whereas a low cost $C(A)$ may desirably correspond to sets attributes A for which conditional distributions $P(Y|A)$ are relatively highly uncertain. For a distribution $P(Y)$ over users, an identity loss function $L(P(Y))$ can be defined that maps probability distribution over users Y to real numbers. L can be chosen in such a way that if there exists a user y such that $P(Y=y)$ is relatively close to 1, then the loss $L(P(Y))$ is relatively large. If $P(Y)$ is a uniform distribution, then $L(P(Y))$ can be relatively close to 0. In an example, based upon such loss functions, an identifiability cost $I(A)$ can be defined as an expected loss of conditional distributions $P(Y|A=a)$, where the expected loss can be taken over observations $A=a$:

$$I(A)=\Sigma_a P(a) L(P(Y|A=a))$$

In addition to identifiability, an additional additive cost component $S(A)=\Sigma_{a \in A} s(a)$, where $s(a) \geq 0$ is a non-negative quantity can model a subjective sensitivity of attribute a, and other additive costs, such as data acquisition cost, etc. For instance, a cost function $C(A)$ used by the cost determiner component 108 can be a combination of the identifiability cost $I(A)$ and sensitivity $S(A)$ (e.g., $I(A)+S(A)$).

An example loss function that can be used in connection with a cost function is $L_m(P(Y))=\max_y P(Y)$. Such a loss function can be interpreted as follows: an adversary may seek to identify the user Y. The adversary can predict a most likely user and receive a reward (e.g., one unit reward) if the user is guessed correctly and can receive a 0 otherwise. The following identifiability cost can be an expected win obtained by an adversary:

$$I_m(A)=\Sigma_a P(a) \max_y (P(y|A=a)).$$

Another example criterion that can be used by the cost determiner component 108 is k-anonymity. With such a measure, data is called k-anonymous if any combination of attributes is matched by at least k people. A probabilistic notion of k-anonymity $I_k$ can be defined by using an example loss function $L_k(P(Y))$ which is 1 if P is nonzero for less than k values of Y, 0 otherwise. An identifiability cost may then be defined by the following algorithm:

$$I_k(A)=\Sigma_a P(a) L_k(P(Y|A=a)).$$

In an example, $I_k(A)$ can be interpreted as an expected number of violations of k-anonymity; a database (empirical distribution over users) can be k-anonymous if and only if $I_k(A)=0$.

Several example algorithms that can be used by the value of information determiner component 102 and/or the cost determiner component 108 have been provided above. It is to be understood, however, that other manners of determining a value of information with respect to attributes that correspond to users in connection with a personalized search and other manners of determining a cost to one or more users for acquiring certain attributes are contemplated and intended to fall under the scope of the hereto-appended claims.

The system 100 further includes an analyzer component 110 that receives the value of information determined by the value of information determiner component 102 and the cost determined by the cost determiner component 108 and outputs an indication 112 of a net benefit to the user with respect to sharing a particular set of attributes for employment in connection with a personalized search. The indication 112 may be, for example, a difference between the value of information with respect to a particular set of attributes and the cost with respect to the particular set of attributes. Such indication may be used, for example, to request particular information from a user. In another example, data can be collected over time from a user that pertains to a set of attributes that correspond to a relatively high net benefit to the user. Example uses of the indication 112 are described in detail herein.

Figure 2:
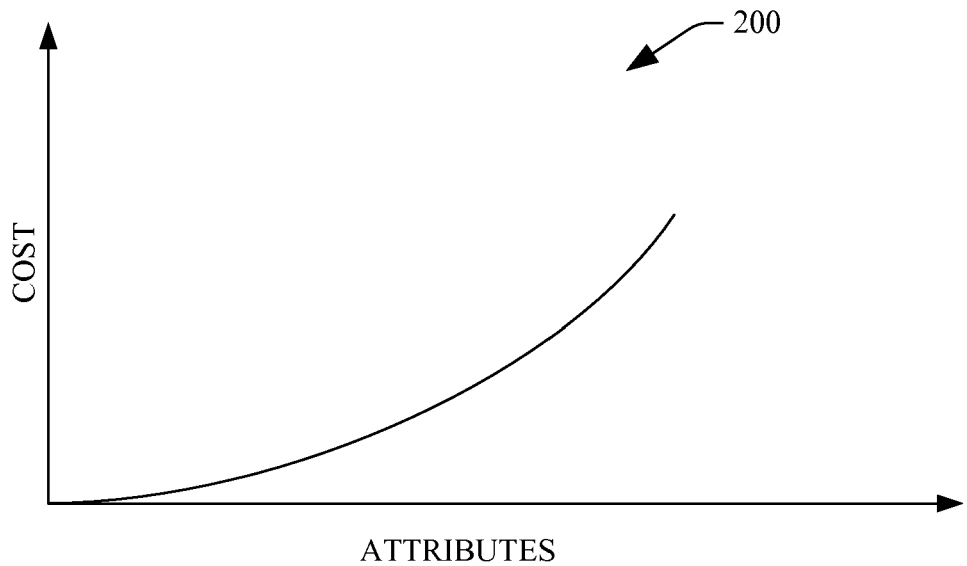
FIG. 2 is an example graph that depicts a cost to a user of sharing attributes versus a number of attributes shared by the user.

Now referring to FIG. 2, an example graph 200 depicting cost with respect to attributes acquired for use in performing a personalized search is illustrated. As can be discerned, as additional attributes are acquired, cost as perceived by a user typically increases. For example, certain attributes, if acquired, can be used to identify the user with a certain probability. Furthermore, the user may be particularly sensitive with respect to certain attributes being acquired.

Figure 3:
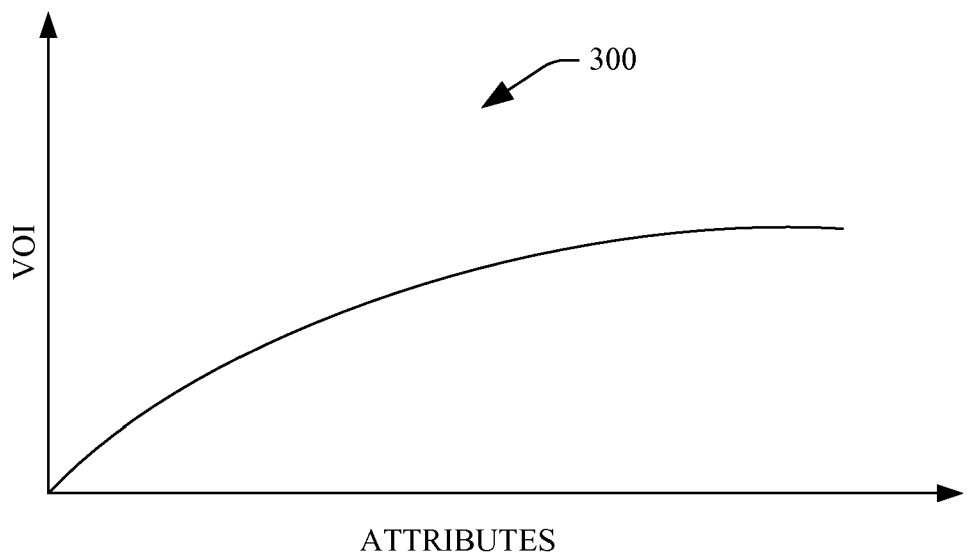
FIG. 3 is an example graph that depicts a utility to a user of sharing attributes versus a number of attributes shared by the user.

Referring briefly to FIG. 3, an example graph 300 that depicts value of information with respect to attributes acquired for use in performing a personalized search is provided. The graph 300 illustrates that, as additional attributes are acquired, the value of information increases. It can be noted, however, that the graph depicts diminishing returns as additional attributes are acquired.

Figure 4:
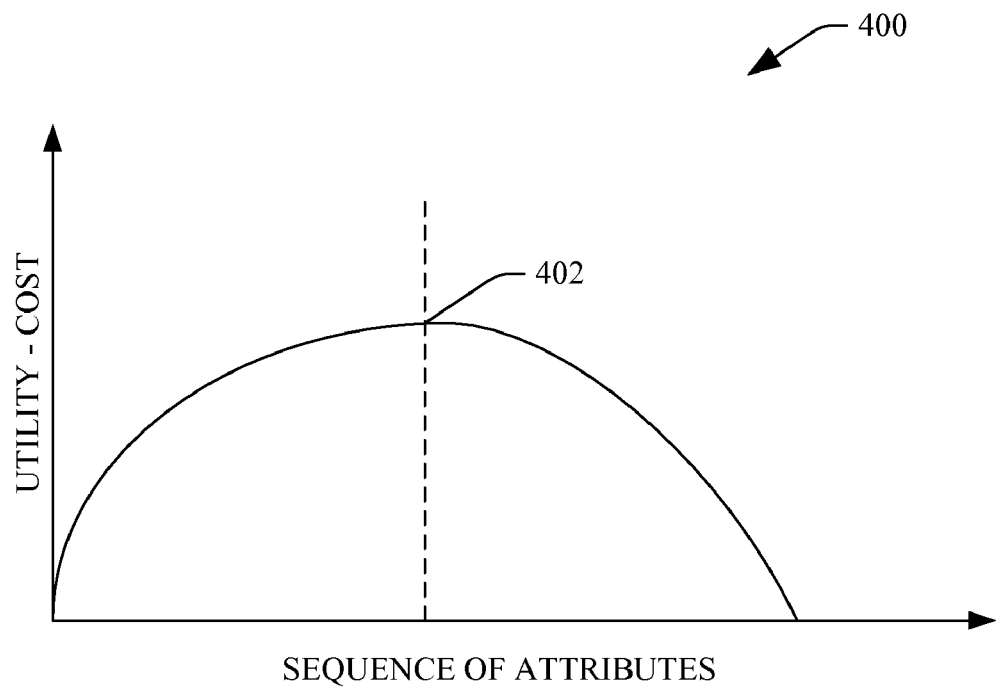
FIG. 4 is an example graph that depicts an optimization of a net benefit to the user of sharing certain attributes.

Now turning to FIG. 4, an example graph 400 is provided that illustrates that acquiring a certain set of attributes with respect to a user can optimize or substantially optimize a trade-off between cost and value of information. Such a set of attributes can correspond to a set of attributes amongst all possible sets of attributes that has a greatest difference between cost and value of information.

Figure 5:
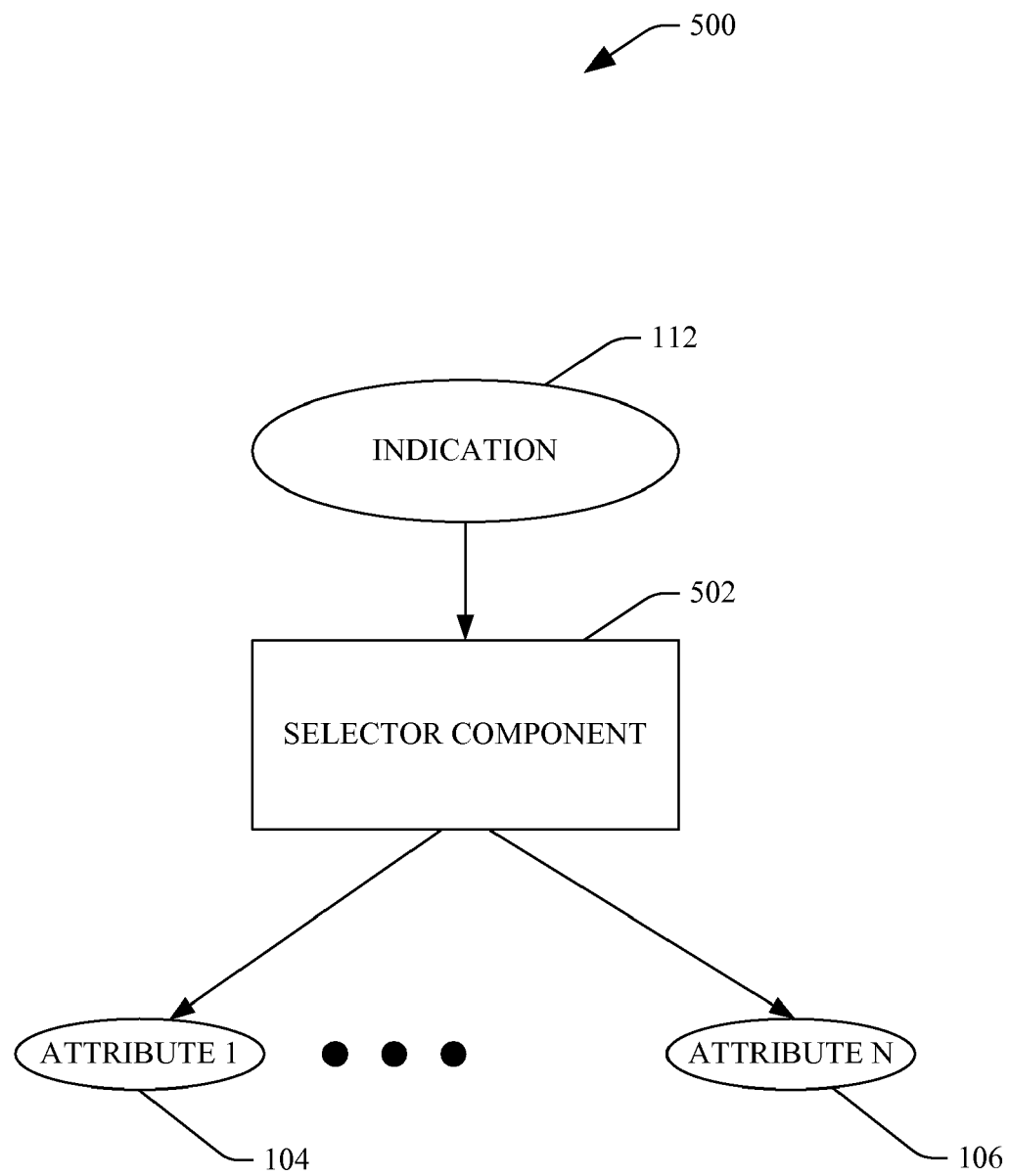
FIG. 5 is a functional block diagram of an example system that facilitates selecting a subset of attributes that, when shared by a user, correspond to an optimal or substantially optimal net benefit to the user.

Now referring to FIG. 5, an example system 500 that facilitates selecting a subset of attributes from amongst a set of available attributes that maximizes or substantially maximizes a net benefit to the user with respect to personalized searching is illustrated. The system includes a selector component 502 that receives one or more indications 112 as output by the analyzer component 110 (FIG. 1). As noted above, such indications can represent a difference between a cost to the user of acquiring a certain set of attributes and a value of information for acquiring the certain set of benefits with respect to personalized search. The selector component 502 can select a set of attributes that optimizes or substantially optimizes a net benefit to the user with respect to sharing the set of attributes based at least in part upon the one or more indications 112.

Pursuant to an example, the selector component 502 can receive indications with respect to all possible sets of attributes in the attributes 104-106. The selector component 502 may then select the set of attributes that corresponds to the greatest difference between the cost of the set and the value of information of the set (e.g., the set has the greatest net value to the user). The selector component 502 may perform such selection at any suitable time. For instance, the selector component 502 may perform such selection a single time for all users of a search engine that use personalized search. In another example, the selector component 502 may perform the aforementioned selection for a particular user a single time. In still yet another example, the selector component 502 may perform the selection for a user during each search session. In yet still another example, the selector component 502 may perform the described selection upon receipt of a query.

The selector component 502 can be flexible as notions of privacy change with time. For instance, what may be considered sensitive or an invasion of privacy today may not be considered sensitive or an invasion of privacy a few years from now. These changes in notions of privacy can be reflected in the cost determined by the cost determiner component 108, which in turn can be considered by the selector component 502.

Rather than performing a greedy search to determine a set of attributes that maximizes or substantially maximizes a net benefit to a user with respect to personalized search, various approximations to more global optimizations can be employed. For instance, concepts of submodularity and supermodularity can be considered and used as a basis for an algorithm that can be employed by the selector component 502 to provide an optimization that is attained via a greedy procedure but that is within a well-characterized distance from a substantially ideal value of a solution achieved via a global optimization that could be obtained, for example, via an exhaustive (and typically intractable) search over all possible sets of private data that might be shared with an online service. It is to be understood, however, that any suitable optimization/approximation is contemplated by the inventors and is intended to fall under the scope of the hereto-appended claims.

The system 500 may additionally include an information requester component 504 that can request information from a user to, for instance, maximize or substantially maximize a net benefit with respect to personalized search. Pursuant to an example, a particular set of attributes corresponding to the user may be known. The information requester component 504 can request one or more additional attributes that may enhance searches without greatly increasing cost. Thus, for instance, the information requester component 504 may indicate that search results will be improved by a certain percentage if the user provides one or more particular attributes, such as age and occupation.

Figure 6:
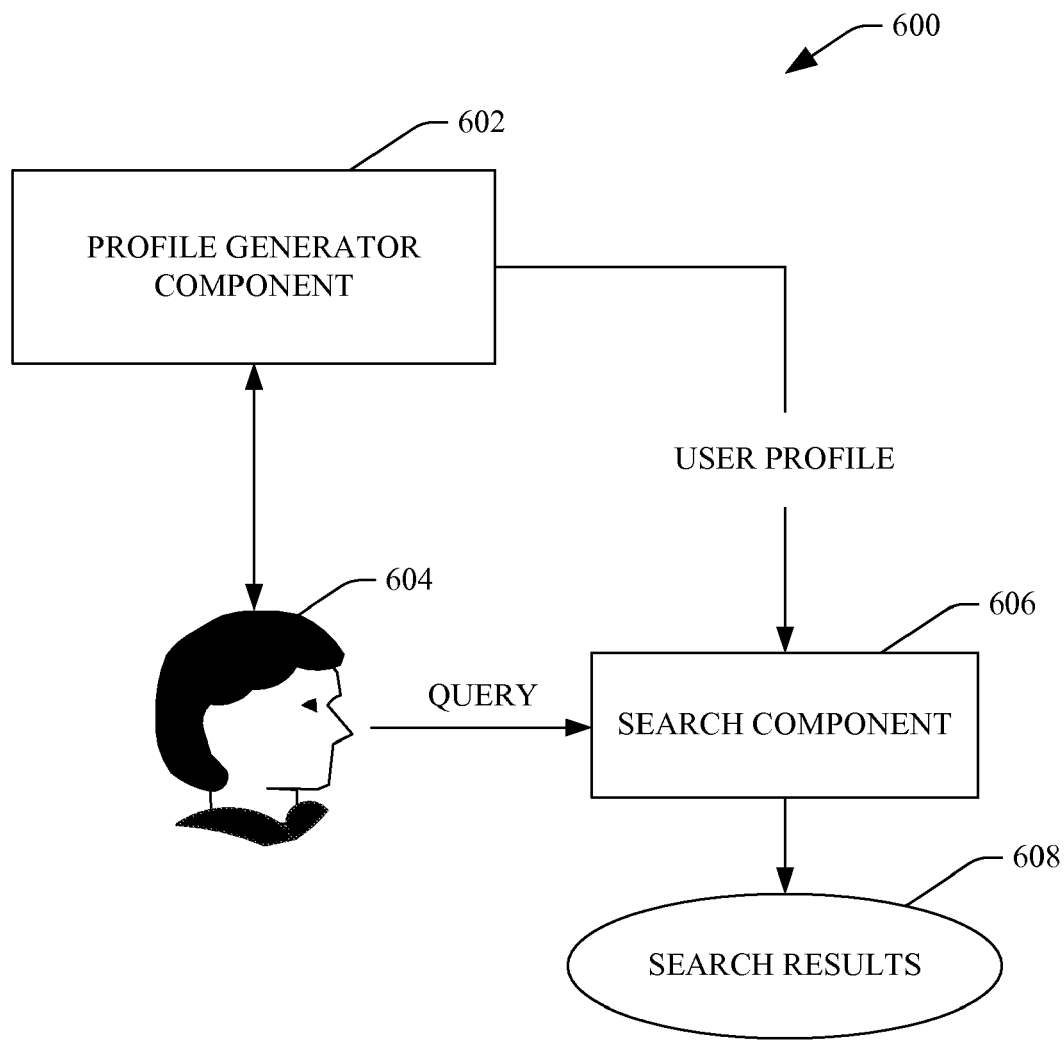
FIG. 6 is a functional block diagram of an example system that facilitates generating a user profile.

Now referring to FIG. 6, an example system 600 that facilitates creation of a user profile for use in connection with performing a personalized search is illustrated. The system 600 includes a profile generator component 602 that, for instance, can provide information to a user 604 and receive information from the user 604 with respect to generating a profile. Pursuant to an example, the profile generator component 602 can provide the user with one or more selectable attributes, wherein user-selection of an attribute indicates that the user is willing to share such attributes. Furthermore, the profile generator component 602 may be in communication with the value of information determiner component 102, the cost determiner component 108, and the analyzer component 110 (FIG. 1), such that the profile generator component 602 can provide recommendations to the user with respect attributes that the user can select.

In an example, the profile generator component 602 can provide the user with an initial recommendation of attributes that, for a large population, result in an optimal or near optimal net benefit for personalized searching. For instance, the profile generator component 602 may request one or more of the attributes or request permission to begin retaining certain data when the user performs a search. The user may have an option of selecting additional attributes, removing attributes from the recommended attributes, or both, wherein addition or removal of attributes can be reflective of notions of privacy as held by the user.

When certain attributes are selected or removed, the profile generator component 602 can provide information relating to effects of selection or removal of attributes. For instance, a user can remove a certain attribute from their profile, and the profile generator component 602 can indicate to the user an expected decrease in search effectiveness based upon the removal of the attribute. In another example, if the user chooses to add an attribute to the user profile, the profile generator component 602 can indicate to the user a gain in search effectiveness (e.g., "addition of this attribute to your profile will cause personalized search effectiveness to increase by 3 percent"). In a similar example, the profile generator component 602 can indicate to the user 604 gains or losses with respect to cost when attributes are added or removed from the user profile (e.g., "addition of this attribute to your profile will increase the probability that you can be identified by 5%").

Moreover, the profile generator component 602 can provide recommendations to the user 604 over time as the user performs searches. For instance, the user 604 may select in the profile that visited web pages can be collected and analyzed. Over time, it may be ascertained that, for the particular user, one or more attributes selected in the user profile is not extremely helpful, while another attribute that has not been selected would significantly enhance personalized searches for the user. The profile generator component 602 can provide information to the user regarding recommended changes in the profile based at least in part upon user history with respect to searches.

The profile generator component 602 can present, for instance, a graphical user interface that allows the user 604 to select one or more attributes for addition to or removal from the user profile. In another example, the profile generator component 602 can provide the user with a series of questions that can be answered by the user, wherein the user's answers are indicative of their notions about privacy. Such notions about privacy can then be used to make recommendations to the user regarding which attributes, if collected, can optimize or substantially optimize a net benefit to the user (as described above) with respect to personalized searching.

In an example, the graphical user interface may be presented independent of a query or in connection with a query. For instance, the profile generator component 602 can provide a graphical interface to the user while the user is performing a search. For example, one or more questions may be provided to the user that request that the user allow certain information to be transmitted with the query (e.g., such as gender and country of residence). Such information can be used to disambiguate the query proffered by the user. In another example, the user may indicate that information provided in connection with a query can be used with respect to future queries or the user may indicate that the information is to be used just for the proffered query.

The user can further indicate when a profile generated by the profile generator component 602 is to be used, where the profile is to be stored, granularity of information, and other information. For instance, the user 604 may indicate that the profile is only to be used when the user 604 explicitly provides permission for such use. In another example, the user 604 may indicate that the user profile is to be retained on their client and is not to be retained on a server. In still yet another example, the user 604 may indicate that the profile is authorized for use in connection with personalized searching for a particular period of time, and thereafter explicit approval from the user 604 is required for use of such profile. In another example, the user may specify a granularity of information that can be used, such as a range around the age of the user (e.g., a range of five years). Other examples will be appreciated by one familiar with the art.

The system 600 also includes a search component 606 that, given a query from the user 604, uses the user profile to perform a personalized search. Thus, the search component 606 (e.g., a search engine) can use attributes authorized for use in the user profile to perform a personalized search for the user 604. The search component 606 may then output search results 608, wherein the search results 608 are ranked based at least in part upon contents of the user profile.

Figure 7:
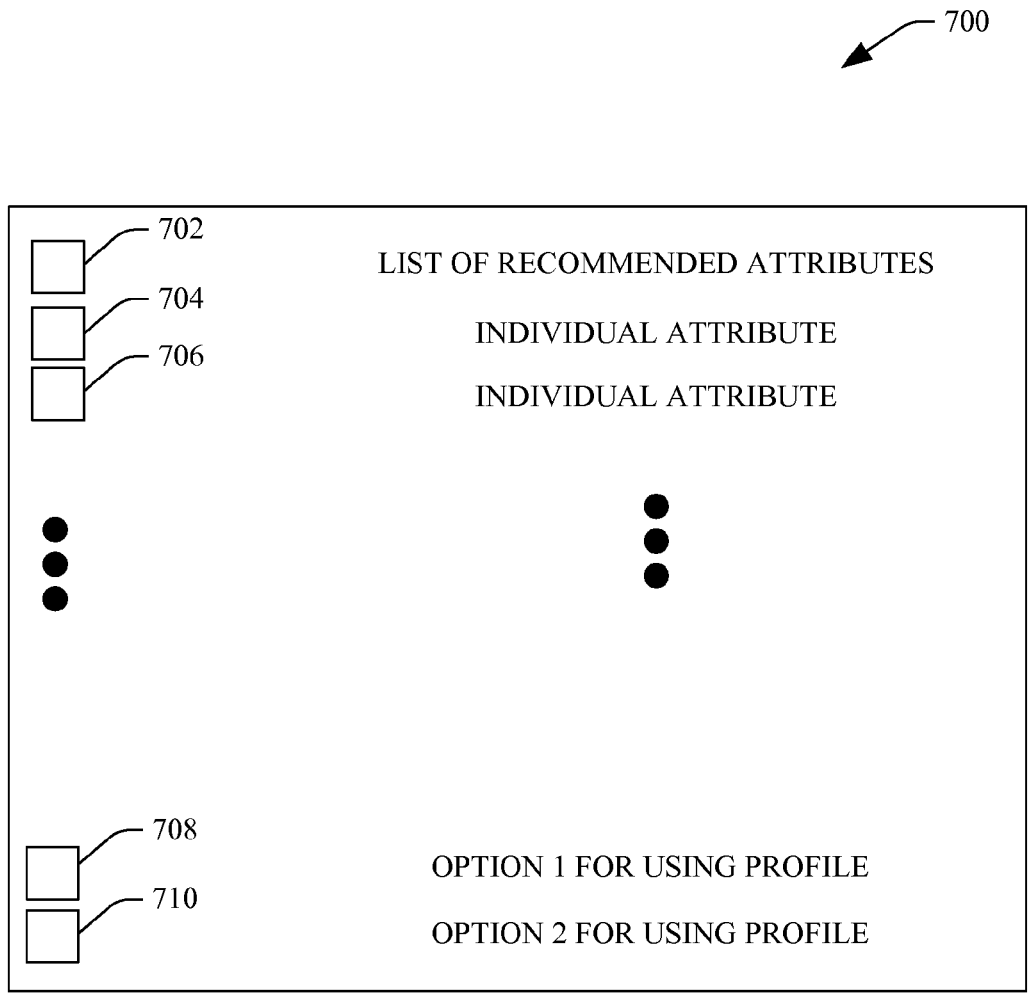
FIG. 7 illustrates an example user profile.

Turning now to FIG. 7, an example graphical user interface 700 that may be used in connection with creating a user profile is depicted. The interface 700 includes a plurality of checkboxes 702-710, where a user can select and/or de-select such checkboxes. In an example, a list of recommended attributes can correspond to the first checkbox 702, wherein user selection of the checkbox 702 indicates that the user authorizes collection, retention, and/or analysis of data that corresponds to attributes in the list of recommended attributes. For instance, as noted above, the recommendation may be based on privacy notions of a large population.

The graphical user interface 700 may also include lists of individual attributes that may be selected or de-selected by the user. For instance, the user may not wish to share certain demographic information, such as their age, and the checkbox 704 may correspond to an age attribute. Accordingly, the user can de-select the checkbox 704 (or ensure that the checkbox 704 remains clear).

The graphical user interface 700 may also include options for using the profile. In an example, the checkbox 708 may correspond to an option for using the profile for a specific search session. In another example, the checkbox 708 may correspond to an option for storing the profile on a server.

Figure 8:
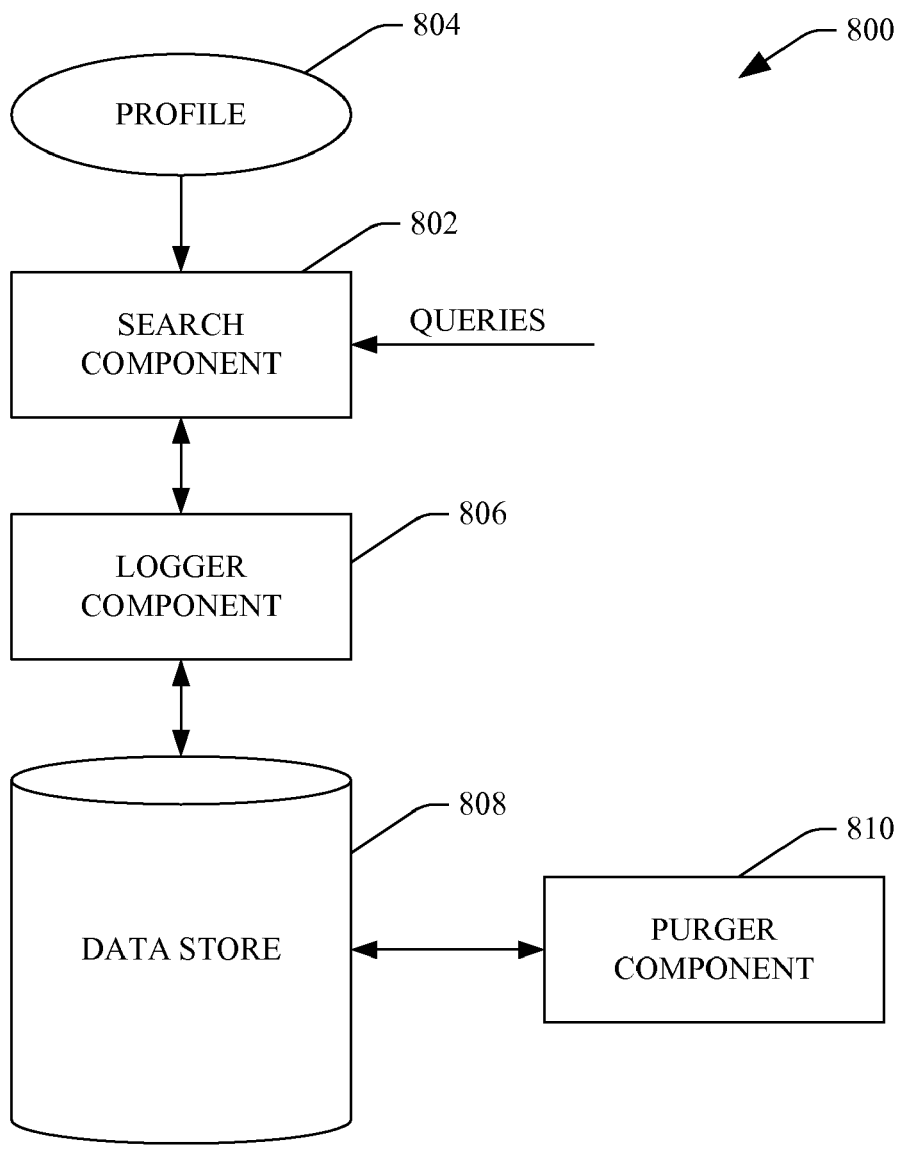
FIG. 8 is a functional block diagram of an example system that facilitates purging data from a data store based at least in part upon privacy notions of a user.

Referring now to FIG. 8, an example system 800 for maintaining data in accordance with privacy notions of one or more users is illustrated. The system 800 includes a search component 802 that uses a user profile 804 created by a user to perform personalized searches for the user. For instance, as described above, the search component 802 can receive one or more queries and can perform a search based at least in part upon the one or more queries and can output ranked search results based at least in part upon the one or more queries and the user profile 804.

Pursuant to an example, the user profile 804 may indicate that, to enhance personalized search, queries and web pages visited can be collected and associated with the user. A logger component 806 can log queries and web sites visited (amongst other data) and generate logs that can be stored in a data store 808. Information in the data store 808 may then be subject to analysis in connection with performing personalized search.

The user profile 804 may also indicate that the user does not wish that their location be known (e.g., within 100 miles). Over time, given a certain set of queries and web pages visited, an inference of the user's location can be made with a relatively high probability. Pursuant to an example, the user may enter the following query multiple times: "Cleveland restaurants." Based upon such queries, it can be inferred with a particular probability that the user lives in or near Cleveland.

The system 800 additionally includes a purger component 810 that can automatically purge data from the data store 808 to maintain restrictions in the user profile 804. In another example, the purger component 810 can be employed to maintain an appropriate balance between value of information and costs to the user of obtaining information. For instance, as more data is obtained, the user can become more identifiable. The purger component 806 can automatically purge collected data in the data store 808 until identifiability drops below a threshold (e.g., a user-defined threshold).

With reference now to FIGS. 9-13, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. Further, it is to be understood that at least some of the acts may be supplemented by functionality, acts, and/or features described above.

Figure 9:
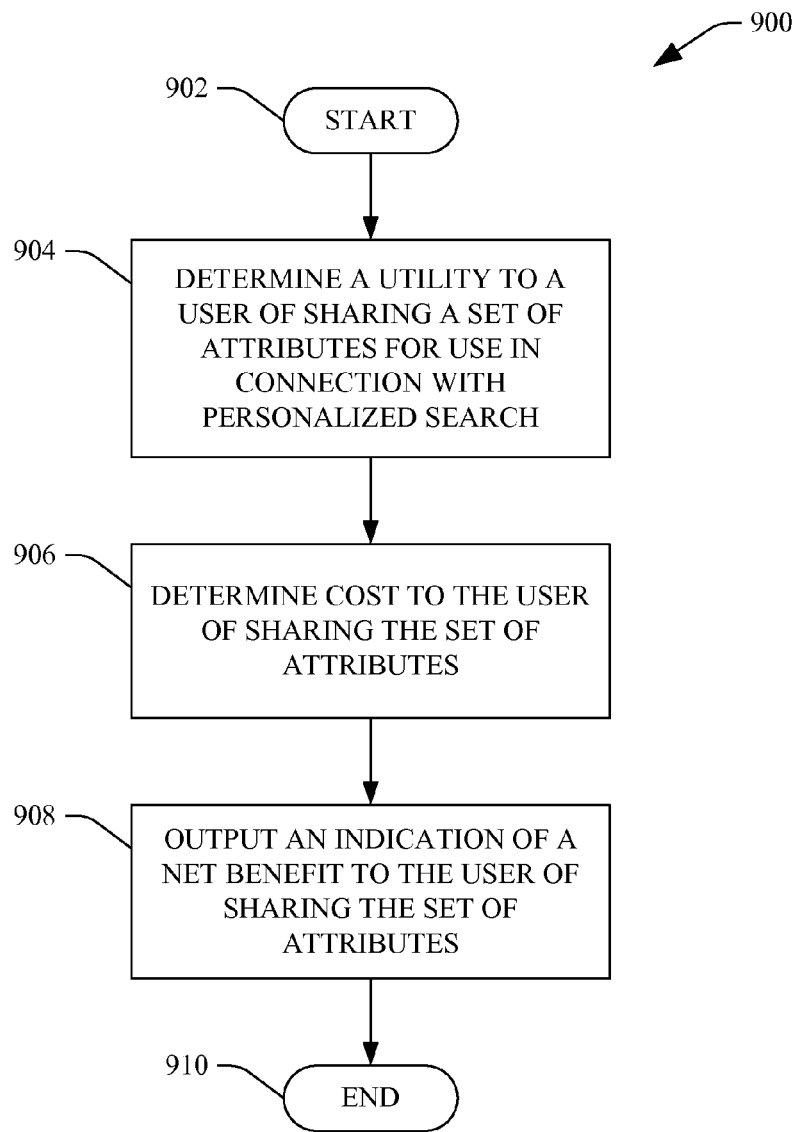
FIG. 9 is flow diagram that illustrates an example methodology for outputting an indication of a net benefit to a user of sharing one or more attributes that correspond to the user.

Referring specifically to FIG. 9, an example methodology 900 for determining a net benefit to a user of sharing certain attributes about the user for personalized search is illustrated. The methodology 900 starts at 902, and at 904 a utility to a user of sharing a set of attributes about the user for employment in connection with personalized search is determined. For instance, the set of attributes may include occupation of the user, web sites visited by the user, topics of interest to the user, location of the user, IP address of the user, time of day that searches are performed, age of the user, gender of the user, amongst other attributes. Furthermore, the set of attributes may be a single attribute or numerous attributes. The utility to the user may be, for instance, an expected enhancement in ranked search results when the attributes are used versus when the attributes are not used.

At 906, a cost to the user of sharing the attributes is determined. The cost, for example, may reflect notions about privacy held by the user. Pursuant to an example, the cost may be based at least in part upon a probability that the user can be identified with the attributes in the set of attributes. Thus, the determined cost may correspond to user-input regarding which attributes the user is willing to share.

At 908, an indication of the net benefit to the user of sharing the attributes is output, wherein the net benefit is based at least in part upon the determined utility and the determined cost. For instance, the net benefit may be the difference between the determined utility and the determined cost. The methodology 900 then completes at 910.

Figure 10:
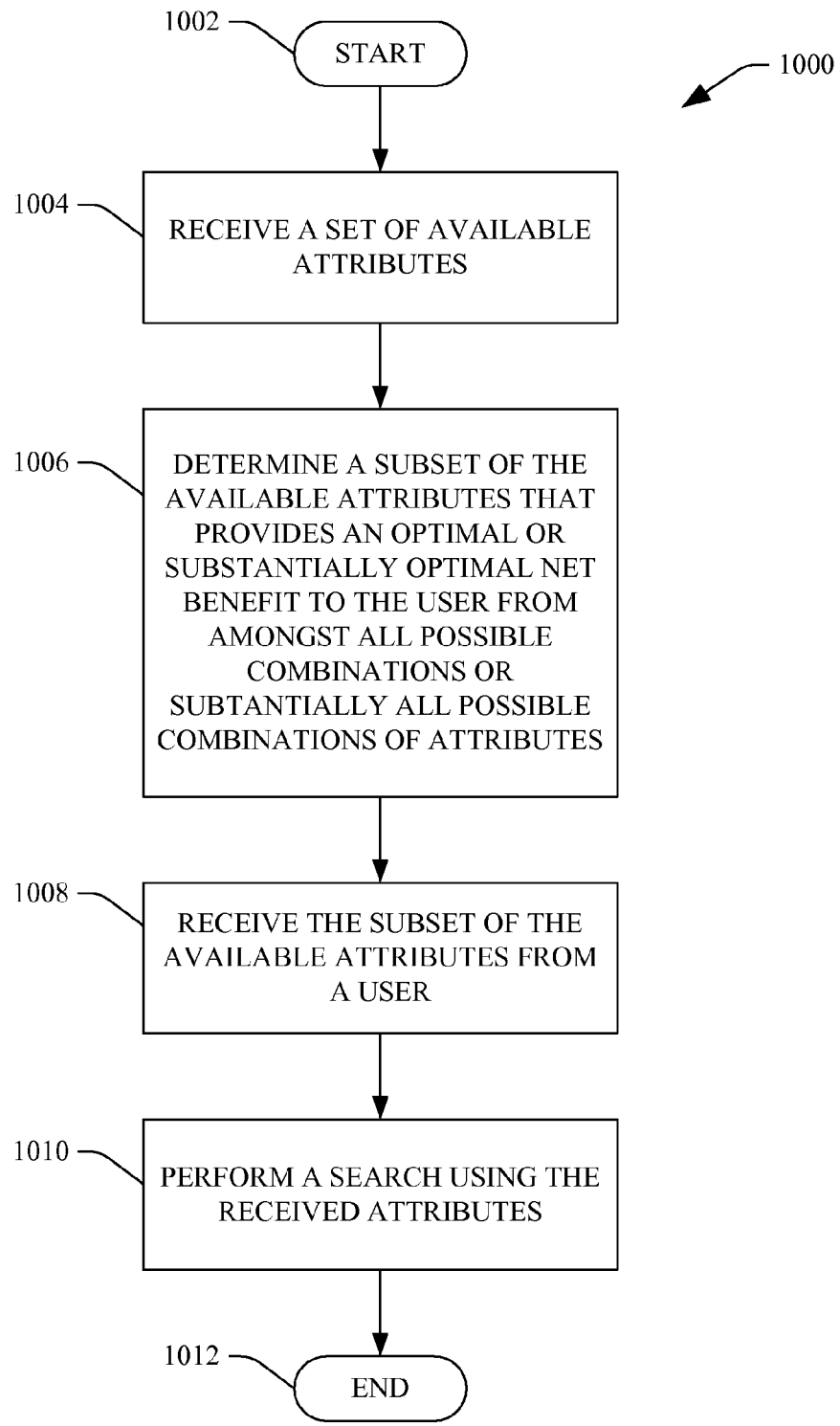
FIG. 10 is a flow diagram that illustrates an example methodology for performing a personalized search using one or more attributes that correspond to a user

Referring now to FIG. 10, an example methodology 1000 for performing a personalized search is illustrated. The methodology 1000 starts at 1002, and at 1004 a set of available attributes are received. For instance, each attribute that can be collected with respect to a particular user can be the set of available attributes. In another example, each attribute that can be collected with respect to a population of users can be the set of available attributes.

At 1004, a subset of the available attributes is determined that provides an optimal or substantially optimal net benefit to the user amongst all or substantially all possible combinations of attributes in the available attributes. This subset of attributes can be determined, for example, for a particular user or for a population of users.

At 1006, at least a portion of the subset of attributes (e.g., the attributes not already known) is received from a user. For instance, the user may provide certain demographic attributes that are in the subset of attributes.

At 1008, a search is performed using the subset of attributes. More particularly, the user can provide a query to a search engine, and the search engine can perform a search and provide ranked search results based at least in part upon the subset of attributes. The methodology 1000 completes at 1010.

Figure 11:
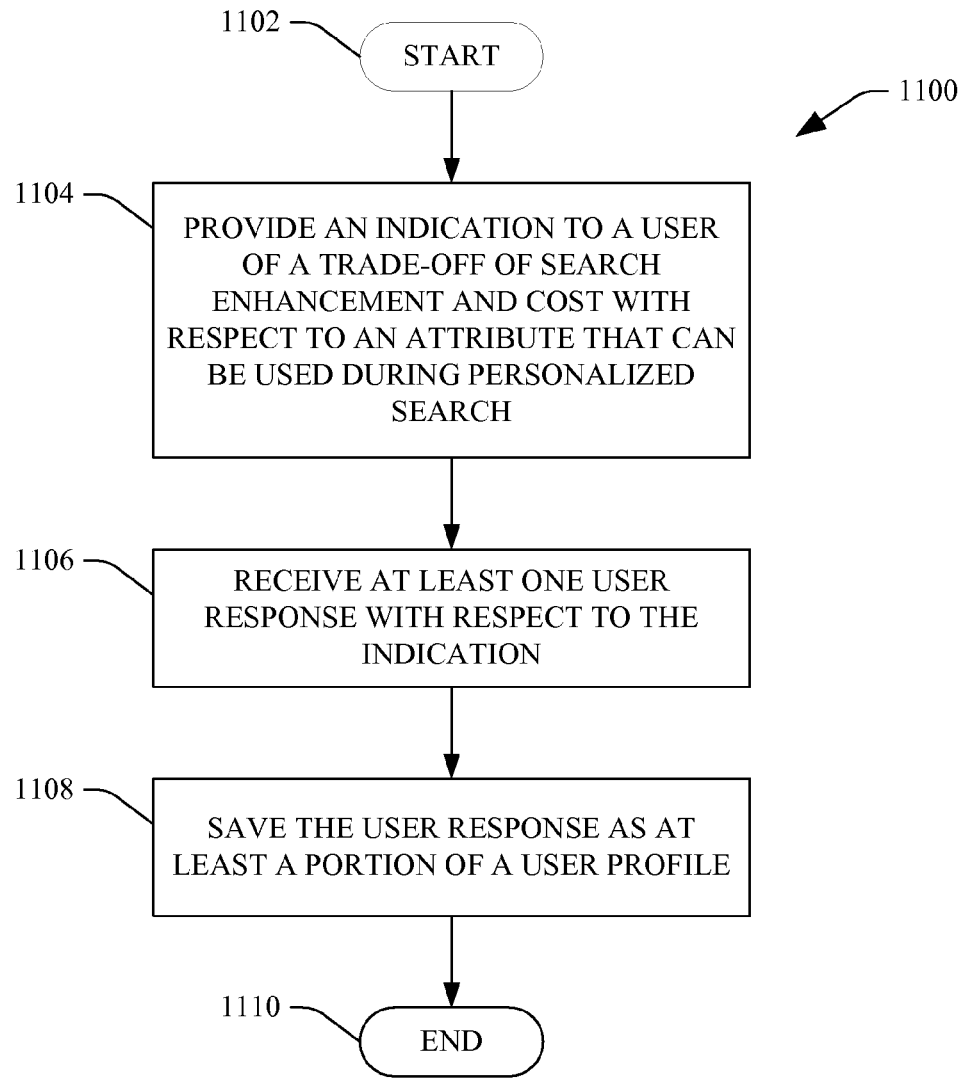
FIG. 11 is a flow diagram that illustrates an example methodology for generating a user profile.

Turning now to FIG. 11, an example methodology 1100 for creating a user profile for employment in connection with personalized search is illustrated. The methodology 1100 starts at 1102, and at 1104 an indication is provided to a user, where the indication relates to a trade-off between search enhancement and cost with respect to at least one attribute that can be used in connection with performing a personalized search.

At 1106, at least one user response is received with respect to the indication. For instance, the user may allow the attribute to be collected and used for personalized search. At 1108, the user response is saved as at least a portion of a profile. The methodology 1100 then completes at 1110.

Figure 12:
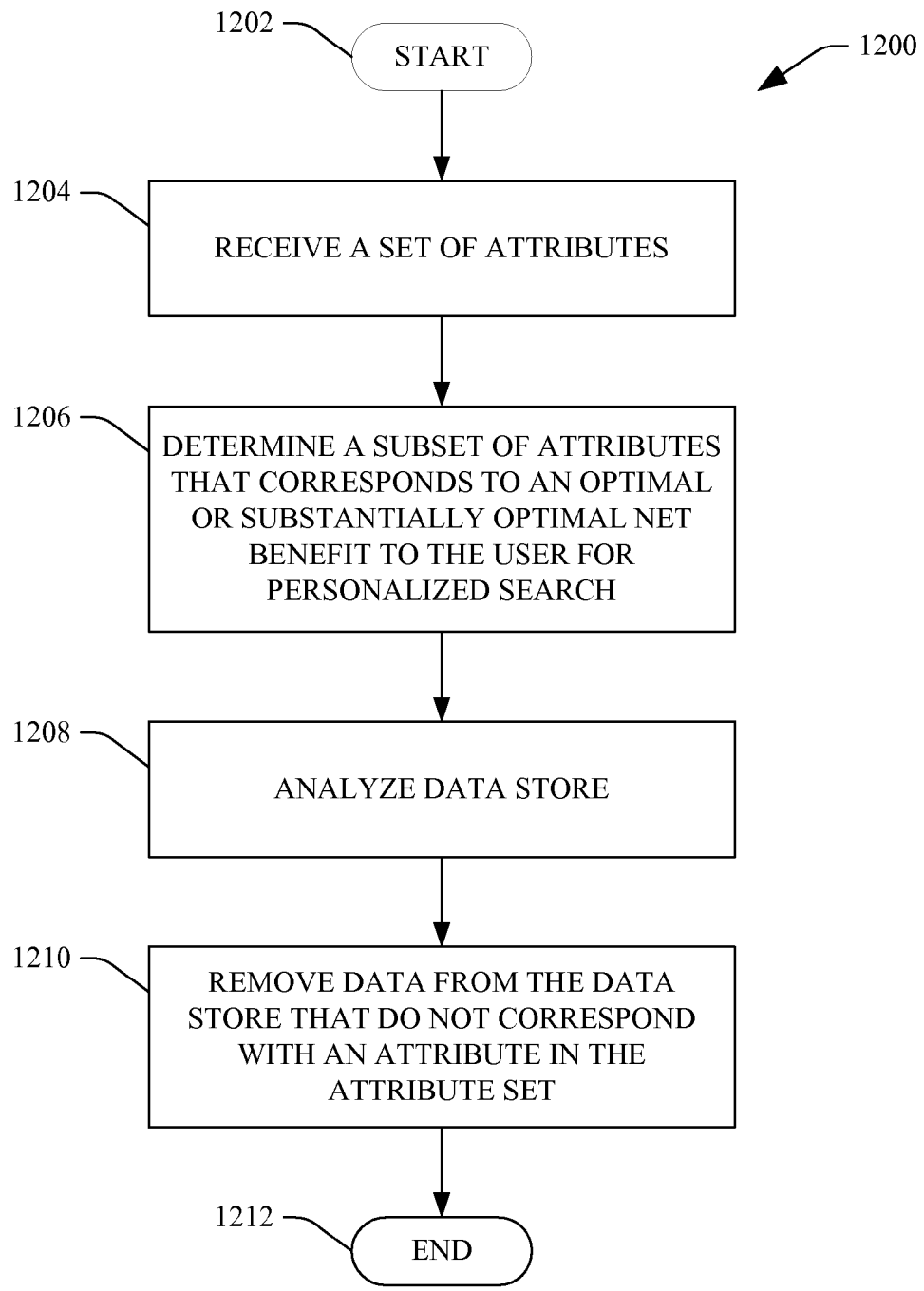
FIG. 12 is a flow diagram that illustrates an example methodology for removing data from a data store based at least in part upon privacy notions of a user.

Referring now to FIG. 12, an example methodology 1200 for discarding data is illustrated. The methodology 1200 starts at 1202, and at 1204 a set of attributes are received. At 1206, a subset of the set of attributes is determined that correspond to an optimal or substantially optimal net benefit to a user for personalized search. At 1208, a data store is analyzed. The data store may include, for example, attributes pertaining to one or more users that can be used in connection with personalized search. For instance, such attributes may be collected over time. At 1210, data that corresponds to an attribute that is not in the subset of attributes is removed from the data store. Accordingly, data used by a search engine to perform personalized searches can be altered based at least in part upon notions of privacy of one or more users and benefit to users of retaining the data. The methodology 1200 completes at 1212.

Figure 13:
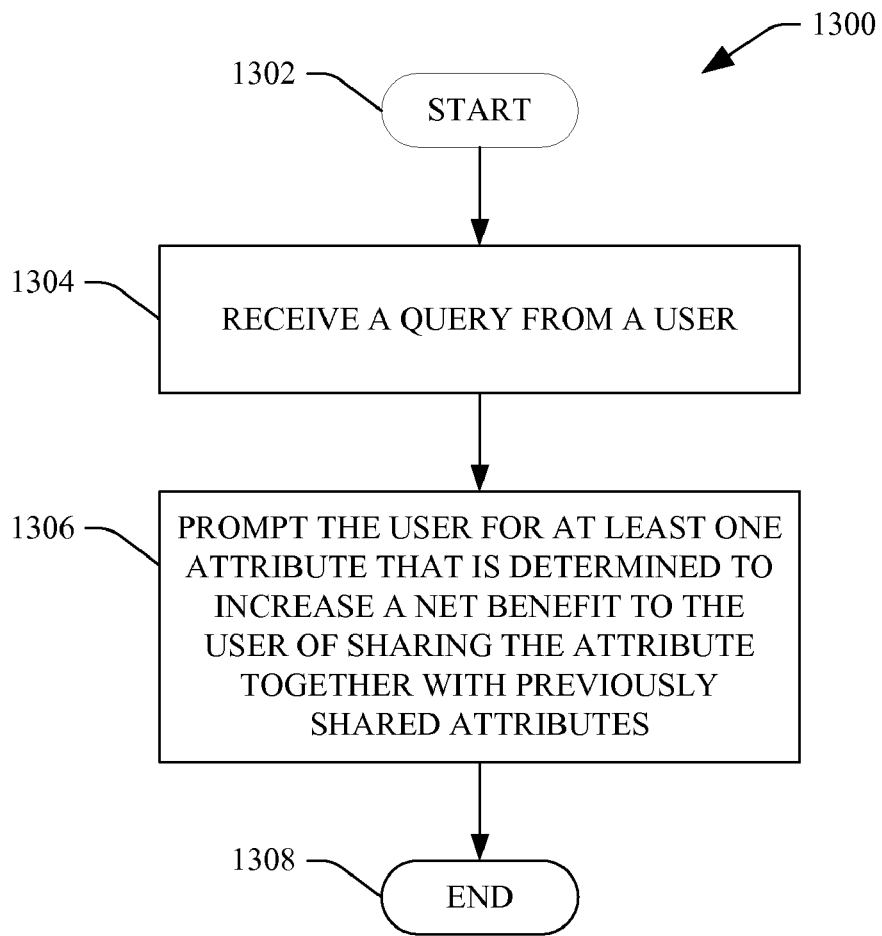
FIG. 13 is a flow diagram that illustrates an example methodology for prompting a user for attributes when the user is performing a search.

Now referring to FIG. 13, a methodology 1300 for obtaining attributes from a user is illustrated. The methodology 1300 starts at 1302, and at 1304 a query is received from a user. At 1306, the user is prompted for at least one attribute, wherein sharing of the attribute is determined to increase a net benefit to the user when such attribute is shared in combination with previously shared attributes. The methodology 1300 completes at 1308.

Figure 14:
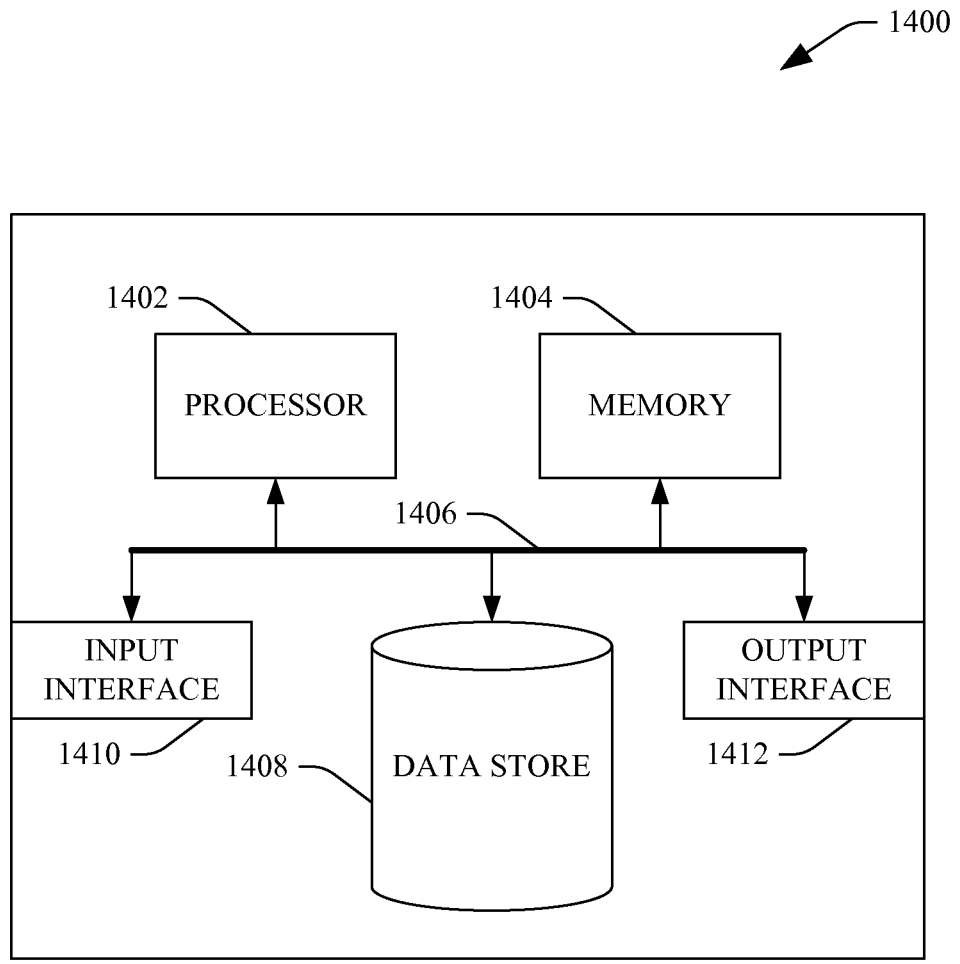
FIG. 14 is an example computing system.

Now referring to FIG. 14, a high-level illustration of an example computing device 1400 that can be used in accordance with the systems and methodologies disclosed herein is illustrated. For instance, the computing device 1400 may be used in connection with a web-based search system, such as a search engine. Accordingly, the computing device 1400 may be or be included within a server system. In another example, the computing device 1400 may be or be included in a client device, such as a desktop computer, a laptop computer, a personal digital assistant, and the like. The computing device 1400 includes at least one processor 1402 that executes instructions that are stored in a memory 1404. The instructions may be, for instance, instructions for implementing functionality described as being carried out by one or more components discussed above or instructions for implementing one or more of the methods described above. The processor 1402 may access the memory by way of a system bus 1406. In addition to storing executable instructions, the memory 1404 may also store attributes, a profile, log data, etc.

The computing device 1400 additionally includes a data store 1408 that is accessible by the processor 1402 by way of the system bus 1406. The data store 1408 may include executable instructions, attributes, a profile, log data, etc. The computing device 1400 also includes an input interface 1410 that allows users or external devices to communicate with the computing device 1400. For instance, the input interface 1410 may be used to receive instructions from an external computer device, attributes from a user, etc. The computing device 1400 also includes an output interface 1412 that interfaces the computing device 1400 with one or more external devices or allows information to be provided to a user. For example, the computing device 1400 may display images, search results, or the like by way of the output interface 1412.

Additionally, while illustrated as a single system, it is to be understood that the computing device 1400 may be a distributed system. Thus, for instance, several devices may be in communication by way of a network connection and may collectively perform tasks described as being performed by the computing device 1400.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising:
   providing a set of attributes to a search engine for use in connection with personalized searching, wherein the set of attributes comprises a plurality of subsets of attributes, and wherein each attribute is a user-specific variable or a query-specific variable;
   determining, for each subset of attributes, a respective value to a user of sharing a respective subset of attributes for use in connection with personalized searching, the respective value being indicative of an improvement in search results when considering the respective subset of attributes relative to search results when failing to consider the respective subset of attributes;
   determining, for the respective subset of attributes, a respective cost to the user of sharing the respective subset of attributes for use in connection with personalized searching, the respective cost based on a probability that the user is identifiable based upon the respective subset of attributes;
   utilizing a processor to compute a respective net benefit to the user of sharing the respective subset of attributes, the respective net benefit to the user being computed by the processor based at least in part upon the respective value and the respective cost to the user of sharing the respective subset of attributes; and
   selecting a subset of attributes from the plurality of subset of attributes for use by the search engine when performing the personalized searching based at least in part upon the respective net benefit computed for the subset of attributes.

2. The method of claim 1, wherein the respective cost is based at least in part upon an indication of which attributes the user is willing to share with a search engine when the search engine executes searches responsive to receipt of queries from the user.

3. The method of claim 1, wherein the respective value is based at least in part upon an expected click entropy reduction, wherein the click entropy reduction indicates an expected change in click entropy between 1) when the subset of attributes is not used when a search is performed; and 2) when the subset of attributes is used when the search is performed.

4. The method of claim 1, further comprising:
receiving a profile from the user that includes a subset of attributes in the set of attributes that the user is willing to share; and
using the profile to perform a search when the user provides a query to a search engine.

5. The method of claim 1, further comprising:
receiving a query; and
responsive to receiving the query, prompting the user for at least one attribute that is determined to increase the net benefit to the user of sharing the at least one attribute together with previously shared attributes.

6. The method of claim 1, further comprising, for a single search session, using a profile when performing a personalized search.

7. The method of claim 1, further comprising:
receiving the set of attributes; and
selecting the subset of attributes based upon the respective net benefit being optimal relative to net benefits of other considered subsets of attributes.

8. The method of claim 7, further comprising:
receiving data from the user for at least one attribute in the subset of attributes; and
performing a search using the at least one attribute.

9. The method of claim 1, wherein the cost is based at least in part upon an expected number of violations of k-anonymity corresponding to the respective subset of attributes, wherein k-anonymity indicates that the subset of attributes is matched by k people.

10. A system comprising:
a processor; and
a memory that comprises a plurality of components that are executed by the processor, the plurality of components comprising:
a value of information determiner component configured to determine a value of information to a user of sharing one or more attributes that correspond to the user with a search engine that performs searches, the value of information based upon an expected reduction in click entropy from a base entropy achieved by using the one or more attributes when performing searches;
a cost determiner component configured to determine a cost to the user of sharing the one or more attributes, the cost based upon a probability of identifying the user based on the one or more attributes and a sensitivity to the user of sharing the one or more attributes; and
an analyzer component that is configured to:
receive the value of information determined by the value of information determiner component and the cost determined by the cost determiner component; and
output an indication of a net benefit to the user of sharing the one or more attributes in connection with personalized searching based at least in part upon the received value of information and the received cost.

11. The system of claim 10, the plurality of components further comprising a selector component configured to select a set of attributes in the one or more attributes that optimizes the net benefit to the user with respect to sharing the set of attributes based at least in part upon the output indication.

12. The system of claim 11, the plurality of components further comprising an information requester component configured to select information from the user to optimize the net benefit to the user with respect to personalized searching.

13. The system of claim 10, the plurality of components further comprising a profile generator component that is configured to:
provide information to the user;
receive information from the user; and
generate a user profile that includes information corresponding to at least one attribute in the one or more attributes that the user has authorized for use during a personalized search.

14. The system of claim 13, the plurality of components further comprising a search component configured to use the user profile to perform the personalized search when a query is received from the user.

15. The system of claim 13, wherein the user profile is authorized for use during a single search session.

16. The system of claim 13, wherein the user profile is retained on a client.

17. The system of claim 10, the plurality of components further comprising:
a logger component configured to generate logs of queries of the user and web sites visited by the user; and
a purger component configured to automatically purge data from the logs generated by the logger component to maintain restrictions in a user profile.

18. The system of claim 10, wherein the value of information determiner component determines the value of information through utilization of the following algorithm:

$$U(A) = H(X|Q) - H(X|Q, A) = \\ -\sum_{x,q,a} P(x, q, a)[\log_2 P(x|q) - \log_2 P(x|q, a)],$$

where U(A) is the value of information, H(X|Q) is the base click entropy, X represents target intentions of the user corresponding to Q requests, H(X|Q, A) is a click entropy when the one or more attributes A are considered when performing the personalized search, and P is a joint distribution.

19. A computer-readable medium comprising instructions that, when executed by a processor, cause the processor to perform a method, the method comprising:
receiving a set of attributes that are indicative of an identity of a user;
selecting from the set of attributes a subset of attributes employable to perform a personalized search, the subset of attributes providing an optimal net benefit to the user for performing the personalized search, the optimal net benefit being based upon 1) a value of information to the user of sharing the subset of attributes; and 2) a cost to the user of sharing the subset of attributes, the value of information based upon a reduction in click entropy from a base entropy achieved when using the subset of attributes, and the cost based upon a probability that the user is identifiable based upon the subset of attributes;

receiving a query from the user; and performing the personalized search responsive to receipt of the query from the user, the subset of attributes being used in connection with ranking search results that are presented to the user.

20. The computer-readable medium of claim 19, the method further comprising:

responsive to the cost to the user being above a user-defined threshold, automatically purging data associated with a user profile at a data store until a probability that the user is identifiable based upon the subset of attributes drops below a user-defined threshold.

* * * * *